United States Patent
Furuuchi et al.

(10) Patent No.: US 12,095,259 B2
(45) Date of Patent: Sep. 17, 2024

(54) PROTECTION CIRCUIT, BATTERY PACK, AND PROTECTION CIRCUIT OPERATING METHOD

(71) Applicant: DEXERIALS CORPORATION, Tochigi (JP)

(72) Inventors: Yuji Furuuchi, Shimotsuke (JP); Chisato Komori, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 99 days.

(21) Appl. No.: 17/755,373

(22) PCT Filed: Nov. 9, 2020

(86) PCT No.: PCT/JP2020/041709
§ 371 (c)(1),
(2) Date: Apr. 27, 2022

(87) PCT Pub. No.: WO2021/090948
PCT Pub. Date: May 14, 2021

(65) Prior Publication Data
US 2022/0368124 A1  Nov. 17, 2022

(30) Foreign Application Priority Data
Nov. 8, 2019   (JP) .................. 2019-203246

(51) Int. Cl.
*H02H 7/18* (2006.01)
*H01H 37/76* (2006.01)
(Continued)

(52) U.S. Cl.
CPC .............. *H02H 7/18* (2013.01); *H01H 37/76* (2013.01); *H02H 5/047* (2013.01); *H02J 7/00304* (2020.01); *H02J 7/0031* (2013.01)

(58) Field of Classification Search
CPC ..... H02J 7/00304; H02H 5/041; H02H 5/042; H02H 3/085; H02H 7/18
See application file for complete search history.

(56) References Cited

U.S. PATENT DOCUMENTS

2005/0221164 A1* 10/2005 Kawazu ................ H01M 10/42
                                                                        429/61
2007/0159138 A1  7/2007 Furuuchi et al.
(Continued)

FOREIGN PATENT DOCUMENTS

| CN | 105470925 A | 4/2016 |
| JP | 2004193000 A | 7/2004 |

(Continued)

OTHER PUBLICATIONS

"International Application Serial No. PCT/JP2020/041709, International Search Report dated Jan. 12, 2021", w/ English Translation, (Jan. 12, 2021), 5 pgs.

(Continued)

*Primary Examiner* — Jared Fureman
*Assistant Examiner* — Christopher J Clark
(74) *Attorney, Agent, or Firm* — Schwegman Lundberg & Woessner, P.A.

(57) ABSTRACT

Provided is a protection circuit capable of reliably preventing an overcurrent or a sneak current after cutoff to improve safety, implementing cost reduction with a device configuration simpler than conventional device configurations, and further reducing a failure rate of a device. In a protection circuit, after one of two fuse elements provided in each of a plurality of protection elements is blown due to an overcurrent flowing along a current-carrying path, a heater provided in at least one of the plurality of protection elements generates heat due to a sneak current flowing via the plurality of protection elements on the current-carrying path (Continued)

which is remained and the current-carrying path which is remained is cut off due to destruction of the heater.

10 Claims, 12 Drawing Sheets

(51) Int. Cl.
  *H02H 5/04* (2006.01)
  *H02J 7/00* (2006.01)

(56) References Cited

U.S. PATENT DOCUMENTS

| | | | |
|---|---|---|---|
| 2016/0189897 | A1 | 6/2016 | Hasunuma et al. |
| 2020/0388818 | A1* | 12/2020 | Su .................... H01M 50/583 |
| 2022/0407306 | A1* | 12/2022 | Furuuchi ............ H02H 3/085 |

FOREIGN PATENT DOCUMENTS

| | | | |
|---|---|---|---|
| JP | 2006109596 | A | 4/2006 |
| JP | 4095426 | B2 | 3/2008 |
| TW | 201642540 | A | 12/2016 |
| TW | 201816824 | A | 5/2018 |

OTHER PUBLICATIONS

"International Application Serial No. PCT/JP2020/041709, Written Opinion dated Jan. 12, 2021", (Jan. 12, 2021), 3 pgs.

"Taiwanese Application No. 109138913, Office Action dated Jun. 3, 2024", w/ English Translation, (Jun. 3, 2024), 7 pgs.

\* cited by examiner

PROTECTION CIRCUIT, BATTERY PACK, AND PROTECTION CIRCUIT OPERATING METHOD

PRIORITY APPLICATIONS

This application is a U.S. National Stage Filing under 35 U.S.C. § 371 from International Application No. PCT/JP2020/41709, filed on Nov. 9, 2020, and published as WO/2021/090948 on May 14, 2021, which claims the benefit of priority to Japanese Application No. 2019-203246, filed on Nov. 8, 2019; the benefit of priority of each of which is hereby, claimed herein, and which applications and publication are hereby incorporated herein by reference in their entireties.

TECHNICAL FIELD

The present invention relates to a protection circuit, a battery pack, and a protection circuit operating method and relates to, for example, a protection circuit provided between a secondary battery and a charger in a secondary-battery charging/discharging circuit.

Priority is claimed on Japanese Patent Application No. 2019-203246, filed Nov. 8, 2019, the content of which is incorporated herein by reference.

BACKGROUND ART

In the related art, protection circuits are implemented in various mobile devices equipped with secondary batteries such as a portable phone and a portable computer. As a conventional protection circuit, for example, a secondary battery device is configured to include a power storage device, a plurality of protection circuits, and first and second output terminals, wherein each protection circuit has two fuse elements connected in series and wherein a discharging current supplied from the power storage device to an external circuit and a charging current supplied from the external circuit to the power storage device flow through the two fuse elements connected in series within the plurality of protection circuits when the external circuit is connected to the first and second output terminals (Patent Literature 1).

This secondary battery device is configured to include a heater having one end connected to a connection point between the fuse elements and the other end connected to one end of each rectifier element, wherein the other end of each rectifier element is connected to a switch element and wherein a current flows to the heater of each protection circuit through the switch element and the rectifier element when the switch element becomes conductive.

Also, in this secondary battery device, at least two rectifier elements are inserted into a current path connecting terminals of heaters of the protection circuits and at least one rectifier element is reverse-biased even if a voltage difference is generated between the terminals of the heaters of two protection circuits in a state in which a short-circuit current flows and one fuse element is blown. Accordingly, no current flows from the terminal of the heater of one protection circuit to the terminal of the heater of the other protection circuit, and therefore no residual current is generated.

CITATION LIST

Patent Literature

[Patent Literature 1]
Japanese Patent No. 4095426

SUMMARY OF INVENTION

Technical Problem

However, in the protection circuit of Patent Literature 1 described above, because a fuse with a heater (hereinafter also referred to as a self-control protector (SCP)) has a symmetrical structure, a probability that one of two fuse elements will be cut off when a current is cut off is 50%. Thus, when a plurality of SCPs are connected in parallel in the protection circuit, it is not possible to identify which of the two fuse elements in each SCP is a portion where the current will be cut off. Consequently, a sneak current may occur in the protection circuit due to a portion of cutoff occurring in each SCP and an overcurrent may flow from the power storage device to the external circuit. Therefore, because it is necessary to implement a plurality of rectifier elements (diodes) put in one-to-one correspondence with a plurality of SCPs so that an overcurrent is prevented in the entire system, there is a problem that a circuit is complicated, cost increases, and a failure rate of a device further increases due to an increase in the number of parts.

Also, a configuration in which it is possible to identify which of the two fuse elements in each SCP is a portion where a current is cut off by changing the left-right balance of the two fuse elements of the SCP is conceivable. However, in this configuration, it cannot be completely denied that the fuse element on the unintended side may be blown according to a state of the heat capacity balance including circuit parts around the SCP, a housing of the SCP, and the like. If a conductive state of the heater continues, unintended circuit heat generation will occur, which may lead to smoke, ignition, or the like.

Furthermore, because mobile devices have been further enhanced in performance and functionalization in recent years, a high-safety protection circuit capable of reliably preventing an overcurrent is required as the secondary battery charging capacity is further increased.

An objective of the present invention is to provide a protection circuit, a battery pack, and a protection circuit operating method capable of reliably preventing an overcurrent or a sneak current after cutoff to improve safety, implementing cost reduction with a device configuration simpler than conventional device configurations, and further reducing a failure rate of a device.

Solution to Problem

In order to achieve the aforementioned objective, the present invention provides the following means.
[1] A protection circuit including:
  a plurality of protection elements connected in parallel on a current-carrying path between a battery and an external circuit,
  wherein each of the plurality of the protection elements has two fuse elements connected in series on the current-carrying path and a heater configured to blow the fuse elements in a current-carrying process, and
  wherein, after one of the two fuse elements provided in each of the plurality of protection elements is blown due to an overcurrent flowing along the current-carrying path, the heater provided in at least one of the plurality of protection elements generates heat due to a sneak current flowing via the plurality of protection elements on the current-carrying path which is remained and the current-carrying path which is remained is cut off due to destruction of the heater.

[2] The protection circuit according to the above-described [1], wherein a temperature coefficient of resistance of the heater is less than 500 ppm/° C.

[3] The protection circuit according to the above-described [1] or [2], wherein a lower limit value of operating power of the plurality of protection elements is set to a value of power higher than power calculated on the basis of a voltage of the battery and resistance including composite resistance of a plurality of heaters on the current-carrying path which is remained.

[4] The protection circuit according to the above-described [3],
wherein the voltage of the battery has a lower limit value of a voltage range of the battery,
wherein the composite resistance of the plurality of heaters is calculated from a lower limit value and an upper limit value of resistance tolerance of the heater, and
wherein the lower limit value of the operating power of the plurality of protection elements is calculated from a lower limit value of a voltage range in a charging/discharging process of the battery and the lower limit value and the upper limit value of the resistance tolerance of the heater.

[5] The protection circuit according to the above-described [4],
wherein an equivalent circuit in which two resistors connected in parallel and one resistor are connected in series is used,
wherein the lower limit value of the voltage range in the charging/discharging process of the battery is set for a voltage applied to both ends of the equivalent circuit.
wherein the lower limit value of the resistance tolerance of the heater is set as a resistance value of the one resistor and a resistance value of one of the two resistors,
wherein the upper limit value of the resistance tolerance of the heater is set as a resistance value of an other of the two resistors, and
wherein power calculated on the basis of the voltage applied to both ends of the equivalent circuit and composite resistance of the two resistors and the one resistor is set so that the power is less than the lower limit value of the operating power of each of the plurality of protection elements.

[6] The protection circuit according to the above-described [1], further including:
a first fuse element and a second fuse element connected in series;
a first electrode unit connected to the first fuse element on a side opposite to the second fuse element;
a second electrode unit connected to the second fuse element on a side opposite to the first fuse element;
a third electrode unit connected between the first fuse element and the second fuse element and connected to the heater in series; and
a fourth electrode unit connected to the heater on a side opposite to the third electrode unit.

[7] The protection circuit according to the above-described [6],
wherein the first fuse element is connected to a side of the battery,
wherein the second fuse element is connected to a side of the external circuit, and
wherein the heater has one end connected to the first fuse element and the second fuse element via the third electrode unit and an other end connected to the battery via the fourth electrode unit.

[8] The protection circuit according to the above-described [7], further including:
a switching element connected between the heater and the battery.

[9] A battery pack including:
the protection circuit according to any one of the above-described [1] to [8].

[10] A method of operating a protection circuit including a plurality of protection elements connected in parallel on a current-carrying path between a battery and an external circuit, the method including:
after one of two fuse elements provided in each of the plurality of protection elements is blown due to an overcurrent flowing along the current-carrying path, generating heat on a heater provided in at least one of the plurality of protection elements, due to a sneak current flowing via the plurality of protection elements on the current-carrying path which is remained, the current-carrying path which is remained being cut off due to destruction of the heater.

Advantageous Effects of Invention

According to the present invention, it is possible to reliably prevent an overcurrent or a sneak current after cutoff to improve safety, implement cost reduction with a device configuration simpler than conventional device configurations, and further reduce a failure rate of a device.

DESCRIPTION OF EMBODIMENTS

Figure 1:
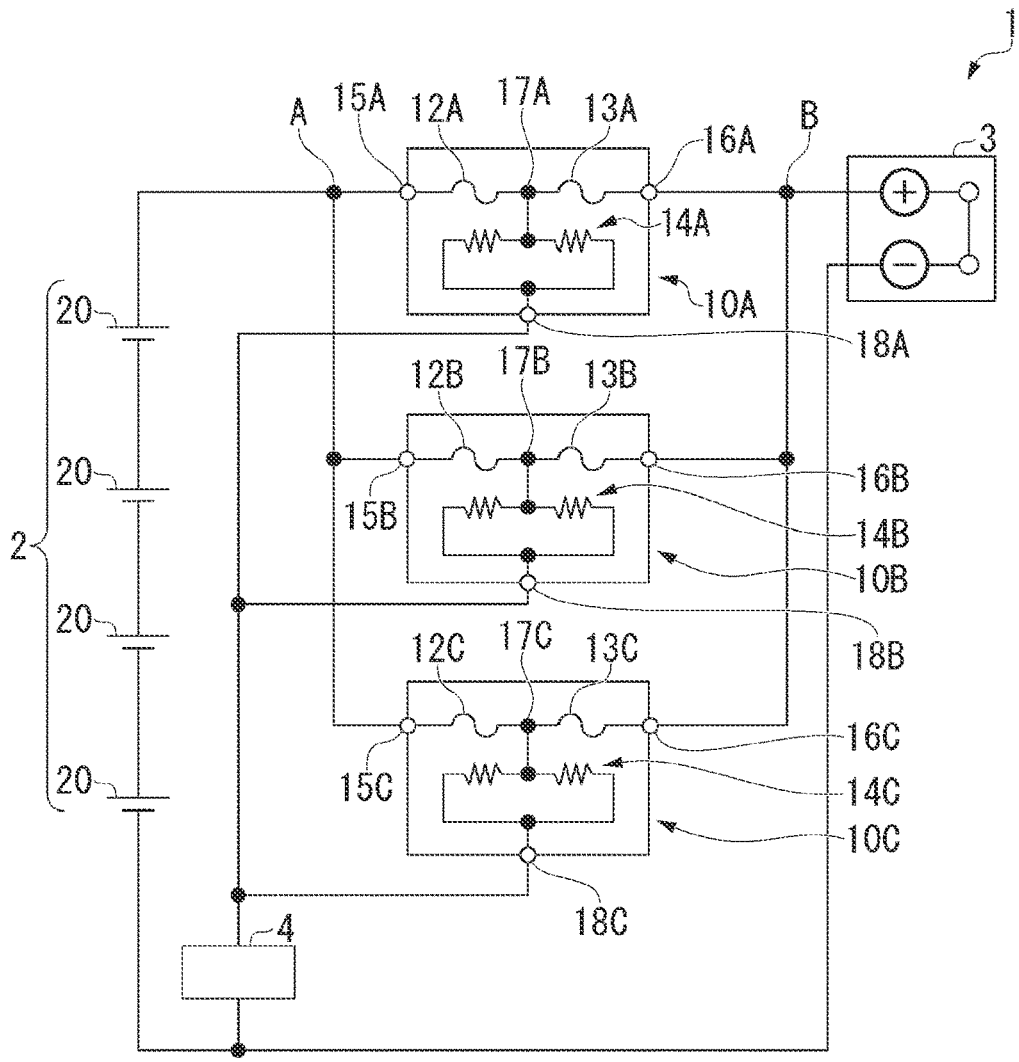
FIG. 1 is a diagram schematically showing an example of a configuration of a protection circuit according to an embodiment of the present invention.

Hereinafter, the present embodiment will be described in detail with reference to the drawings as appropriate. In the drawings used in the following description, featured parts may be enlarged for convenience so that the features of the present invention are easier to understand, and dimensional ratios and the like of the respective components may be different from actual ones. Materials, dimensions, and the like exemplified in the following description are examples, the present invention is not limited thereto, and modifications can be appropriately made in a range in which advantageous effects of the present invention are exhibited.

[Configuration of Protection Circuit]

FIG. 1 is a diagram schematically showing an example of a configuration of a protection circuit according to an embodiment of the present invention. In the protection circuit of the present embodiment, a plurality of protection elements to be described below are surface-mounted. For example, this protection circuit is mounted on a battery pack such as a lithium-ion secondary battery.

As shown in FIG. 1, the protection circuit 1 includes a plurality of protection elements 10A, 10B, and 10C connected in parallel on a current-carrying path between the secondary battery 2 (a battery) and an external circuit. Specifically, a plurality of first electrode units 15A, 15B, and 15C of the plurality of protection elements 10A. 10B, and 10C are connected to a parallel connection point A via the current-carrying path and are connected to positive electrodes of secondary batteries 2, 2, and the like. Also, a plurality of second electrode units 16A, 16B, and 16C of the plurality of protection elements 10A, 10B, and 10C are connected to a parallel connection point B via the current-carrying path and are connected to a positive electrode of a charger 3. A plurality of third electrode units 17A, 17B, and 17C of the plurality of protection elements 10A, 10B, and 10C are connected to fourth electrode units 18A, 18B, and 18C via heaters 14A, 14B, and 14C, respectively. For example, the fourth electrode units 18A, 18B, and 18C are connected to negative electrodes of the secondary batteries 2, 2, and the like and a negative electrode of the charger 3. A switching element 4 such as a field-effect transistor (FET) is provided on a downstream side of the fourth electrode units 18A, 18B, and 18C.

The secondary battery 2 includes one or a plurality of battery cells 20, 20, and the like and the plurality of battery cells 20, 20, and the like are connected in series in the present embodiment. When the secondary battery 2 is charged, power is supplied from the charger 3 to the secondary battery 2 via the current-carrying path. Also, when the secondary battery is discharged, power is supplied from the secondary battery 2 to the current-carrying path. In this way, the same power is supplied to both the first fuse element 12A (12B or 12C) and the second fuse element 13A (13B or 13C) at any one of the time when the secondary battery 2 is charged and the time when the secondary battery 2 is discharged.

The protection circuit 1 may have a detection element (not shown) connected to each of the plurality of battery cells 20, 20, and the like and connected to the switching element 4. This detection element constantly monitors whether or not the state is a high-voltage state, particularly, an overvoltage state, and outputs a control signal to the switching element 4 when an high-voltage state has been reached. In this case, the switching element 4 causes the heater 14A (14B or 14C) to generate heat by allowing a current to flow from the secondary battery 2 to the heater 14A (14B or 14C) in accordance with a detection signal. Thereby, the first fuse element 12A (12B or 12C) and/or the second fuse element 13A (13B or 13C) can be blown.

[Configuration of Protection Element]

Figure 2:
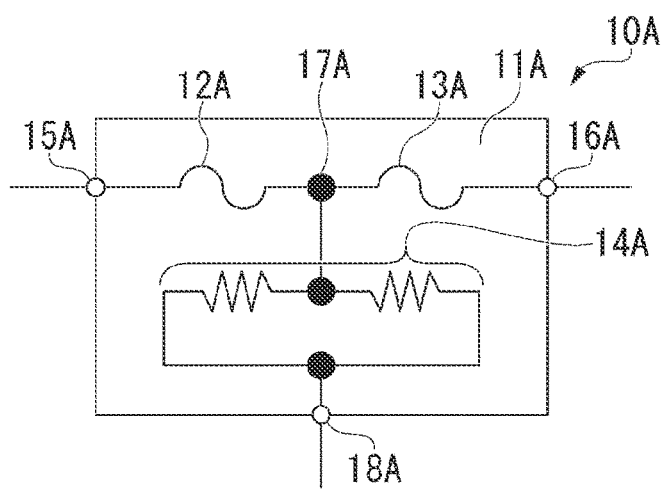
FIG. 2 is a schematic diagram showing an example of a configuration of a protection element provided in the protection circuit of FIG. 1.

FIG. 2 is a schematic diagram showing an example of a configuration of the protection element 10A provided in the protection circuit 1 of FIG. 1. Because the configurations of the protection elements 10B and 10C are the same as the configuration of the protection element 10A, description thereof will be omitted.

As shown in FIG. 2, the protection element 10A includes a board 11A, a first fuse element 12A and a second fuse element 13A (two fuse elements) connected in series on the board 11A, and a heater 14A connected between the first fuse element 12A and the second fuse element 13A and configured to blow the first fuse element 12A and/or the second fuse element 13A in a current-carrying process. Also, the protection element 10A includes a first electrode unit 15A connected to the first fuse element 12A on the side opposite to the second fuse element 13A, a second electrode unit 16A connected to the second fuse element 13A on the side opposite to the first fuse element 12A, a third electrode unit 17A connected between the first fuse element 12A and the second fuse element 13A and connected to the heater 14A in series, and a fourth electrode unit 18A connected to the heater 14A on the side opposite to the third electrode unit 17A.

In the present embodiment, the first fuse element 12A is connected to the secondary battery 2 side and the second fuse element 13A is connected to the charger 3 side (an external circuit side). The heater 14A has one end connected to the first fuse element 12A and the second fuse element 13A via the third electrode unit 17A and the other end connected to the secondary battery 2 via the fourth electrode unit 18A.

The board 11A is not particularly limited as long as it is made of a material having insulating properties. For example, in addition to a board used for a printed wiring board such as a ceramic board or a glass epoxy board, a glass board, a resin board, an insulating treated metal board, or the like can be used. Among these, a ceramic board, which is an insulating board having excellent heat resistance and high thermal conductivity, is preferred.

The first fuse element 12A is provided, for example, on one main surface side of the board 11A, and the second fuse element 13A is also provided on one main surface side of the board 11A. The first fuse element 12A and the second fuse element 13A may be integrally formed or may be configured as separate members. Also, the shapes of the first fuse element 12A and the second fuse element 13A are, for example, flaky, but are not limited to this, and they may be rod-shaped.

The first fuse element 12A and the second fuse element 13A have, for example, a flaky shape having a uniform width and thickness and a length of the first fuse element 12A is the same as that of the second fuse element 13A. In this case, thermal resistance of the first fuse element 12A is the same as that of the second fuse element 13A.

As materials constituting the first fuse element 12A and the second fuse element 13A, various low melting-point metals conventionally used as fuse materials can be used.

Examples of the low melting-point metals include SnSb alloys, BiSnPb alloys, BiPbSn alloys, BiPb alloys, BiSn alloys, SnPb alloys, SnAg alloys, PbIn alloys, ZnAl alloys, InSn alloys, PbAgSn alloys, and the like. The materials constituting the first fuse element 12A and the second fuse element 13A are preferably the same, but may be different.

The heater 14A is provided, for example, on the other main surface side of the board 11A. The heater 14A is disposed to abut against the other main surface of the board 11A and is disposed directly below the third electrode unit 17A. The heater 14A is provided on the side opposite to the first fuse element 12A and the second fuse element 13A of the board 11A, but is not limited to this, and may be provided on the same side as the first fuse element 12A and the second fuse element 13A of the board 11A.

For example, the heater 14A is coated with a resistance paste composed of a conductive material such as ruthenium oxide or carbon black and an inorganic binder such as water glass or an organic binder such as a thermosetting resin and is formed in a baking process as necessary. Also, as the heater 14A, a thin film such as ruthenium oxide or carbon black may be formed through the steps of printing, plating, vapor deposition, and sputtering, or may be formed by sticking or laminating these films and the like.

On the heater 14A, an insulating member (not shown) may be provided to cover the outer surface thereof.

A material constituting the insulating member is not particularly limited as long as it is a material capable of insulating the heater 14A from an external portion and includes, for example, glass ($SiO_2$).

When the heater 14A has resistance tolerance, it is preferable to consider the resistance tolerance in the calculation of the power of the protection element to be described below. The range of the resistance tolerance of the heater 14A is not particularly limited, but is, for example, 4.8Ω to 8.0Ω.

In the present embodiment, the heater 14A has a configuration in which the heater 14A is destructed due to overheating in the current-carrying process due to a sneak current to be described below. In this case, it is preferable that the heater 14A have resistance having low temperature dependence. A temperature coefficient of resistance (hereinafter also referred to as TCR) of the heater 14A is preferably less than 500 ppm/° C., more preferably 400 ppm/° C. or lower, and further preferably 300 ppm/° C. or lower. If the TCR of the heater 14A is 500 ppm/° C. or higher, a period of time is required to generate heat of the heater 14A, and the heater 14A cannot be quickly destructed. Also, the heat generated by the heater 14A may propagate to an exterior member (not shown) made of a resin or the like provided on the upper portion of the protection element 10A and the exterior member may be deformed due to melting and adversely affect a device or a human body. Therefore, the TCR of the heater 14A is set to a value within the above-described range.

As an example of the heater 14A, a heater composed of 87% by mass of ruthenium oxide, 9% by mass of lead oxide, and 4% by mass of boron oxide was prepared, prescribed power was applied to a protection circuit in which three protection elements each having this heater were connected in parallel, and results of inspecting the appearance of each protection element are shown in Table 1. TCRs of the heaters provided in the three protection elements are 300 ppm/° C. and the power applied to the heater at the time of the current-carrying process for the heater is 9.7 W. Also, as another example, results of inspecting the appearance of each protection element are shown in Table 1 as described above, except that three protection elements each having a heater composed of 91% by mass of ruthenium oxide, 5% by mass of lead oxide, and 4% by mass of boron oxide were prepared and the TCRs of the heaters provided in the three protection elements were 100 ppm/° C.

Further, as another example, results of inspecting the appearance of each protection element are shown in Table 1 as described above, except that three protection elements having a heater composed of 85% by mass of ruthenium oxide, 12% by mass of lead oxide, and 3% by mass of boron oxide were prepared, and the TCRs of the heaters provided in the three protection elements were 500 ppm/C.

TABLE 1

| TCR [ppm/° C.] | Resistance when current-carrying process is performed with 9.7 W (number in parentheses represents current-carrying time) [MΩ] | Appearance of protection element |
|---|---|---|
| 500 | 2.0 (80 sec) | Central portion of exterior member is melted |
| 300 | 2.0 (30 sec) | No change |
| 100 | 1.0 (10 sec) | No change |

As shown in Table 1, when the TCR of the heater was 300 ppm/° C., the resistance of the heater became 2.0 MΩ after the elapse of 30 seconds from the start of a current-carrying process, and the current-carrying path was cut off due to the destruction of the heater. There was no change in the appearance of the protection element between the start of the current-carrying process and the cutoff of the path. Also, when the TCR of the heater was 100 ppm/° C., the resistance of the heater became 1.0 MΩ after the elapse of 10 seconds from the start of the current-carrying process, and the heater was destructed in a shorter period of time than when the TCR of the heater was 300 ppm/° C. Also, there was no change in the appearance of the protection element between the start of the current-carrying process and the cutoff of the path.

On the other hand, when the TCR of the heater was 500 ppm/° C., the resistance of the heater became 1.0 MΩ after the elapse of 80 seconds from the start of a current-carrying process and the central portion of the exterior member provided on the upper portion of the protection element was melted and deformed as a result of the long time that it took.

Therefore, by setting the TCR of the heater to less than 500 ppm/° C., preferably less than 400 ppm/° C., the heater can be quickly destructed and the thermal deformation of the exterior member provided on the protection element can be prevented.

The first electrode unit 15A, the second electrode unit 16A, and the third electrode unit 17A are electrodes into which the first fuse element 12A or the second fuse element 13A, which has been melted, flows. The materials constituting the first electrode unit 15A, the second electrode unit 16A, and the third electrode unit 17A are not particularly limited and include a metal of high wettability with respect to the first fuse element 12A or the second fuse element 13A in a melted state. As a material constituting the first electrode unit 15A, the second electrode unit 16A, and the third electrode unit 17A, a single metal such as copper (Cu) or a material in which at least the surface thereof is formed from Ag (silver), Ag (silver)-Pt (platinum), Ag (silver)-Pd (palladium), Au (gold), or the like can be used.

Solder portions (not shown) are provided at positions corresponding to the first electrode unit 15A, the second electrode unit 16A, and the fourth electrode unit 18A. Each of the first electrode unit 15A, the second electrode unit 16A, and the fourth electrode unit 18A is connected to the protection circuit 1 via a solder portion (not shown).

In the protection element 10A, when a large current (an overcurrent) exceeding the rating flows through the protection element 10A, the first fuse element 12A and/or the second fuse element 13A is blown by self-heating (Joule heat) or a detection element (not shown) monitors whether or not the battery is in a high-voltage state, especially an overvoltage state, all the time and outputs a control signal to the switching element 4 when the battery is in a high-voltage state, so that the first fuse element 12A and/or the second fuse element 13A is blown due to heat generation of the heater 14A and therefore the current-carrying path is cut off.

In the protection circuit 1 configured as described above, an overcurrent flows along the current-carrying path, so that, after one of the two fuse elements provided in each of the plurality of protection elements 10A, 10B, and 10C is blown, a heater provided in at least one of the plurality of protection elements 10A. 10B, and 10C generates heat due to a sneak current flowing via the plurality of protection elements 10A, 10B, and 10C on the current-carrying path which is remained and the current-carrying path which is remained is cut off due to destruction of the heater.

Here, if the heater (for example, the heater 14A) of the protection element (for example, the protection element 10A) generates heat due to the sneak current flowing via the plurality of protection elements 10A, 10B, and 10C on the current-carrying path which is remained and the other of the two fuse elements described above is blown, the current-carrying path which is remained will be cut off. However, when the power calculated on the basis of the voltage of the secondary battery 2 and the composite resistance of the plurality of heaters 14A, 14B, and 14C on the above-described current-carrying path which is remained is less than the operating power of the protection element (for example, the protection element 10A), the protection element may not operate normally and the other of the two fuse elements described above may not be blown due to the sneak current. Therefore, in the present embodiment, the heater 14A is overheated due to the sneak current and the heater 14A itself is destructed by the heat to cut off the current-carrying path.

To perform the above-described operation in the protection circuit 1, for example, preferably, the lower limit value of the operating power of each protection element is set so that it is greater than power calculated on the basis of a voltage of the secondary battery 2 and resistance including composite resistance of the plurality of heaters 14A, 14B, and 14C on the current-carrying path which is remained. The "resistance including the composite resistance" indicates a sum of the composite resistance of the plurality of heaters 14A, 14B, and 14C on the above-described current-carrying path which is remained and resistance of another part (not shown) when the other part is mounted on the above-described current-carrying path and indicates the composite resistance itself of the plurality of heaters 14A, 14B, and 14C on the above-described current-carrying path which is remained when the above-described other part is not mounted on the above-described current-carrying path.

Also, when a heat capacity and heat dissipation of the board on which the protection circuit 1 including the battery pack or other peripheral parts is mounted are large, the first and second fuse elements may not be blown normally because the heat generated by the heater (for example, the heater 14A) is taken away by the battery pack or the board even at the voltage within the range of the operating power of each protection element (for example, the protection element 10A), i.e., the range of the operating power of the first and second fuse elements (for example, the first fuse element 12A and the second fuse element 13A). According to this configuration, even in such a case, the current-carrying path can be cut off by the configuration in which the heater 14A is overheated by the sneak current and the heater 14A itself is destructed by the heat. In this case, it is not necessary to set the lower limit value of the operating power of each protection element to be a value greater than the above-described calculated power and it may be less than or equal to the above-described calculated power.

The operating power of the protection element is a power value or a power range required to blow the first fuse element and/or the second fuse element normally in each protection element and is a value given as a characteristic (specification) of each protection element. The range of the operating power of the protection element is not particularly limited, but is, for example, 13 W to 130 W.

The voltage of the secondary battery 2 is a value given as a characteristic (specification) of a cell voltage when the secondary battery 2 is composed of one battery cell. When the secondary battery 2 is composed of a plurality of battery cells, the voltage of the secondary battery 2 is a value given as a characteristic (specification) of their combined voltage (a battery pack voltage). The range of the cell voltage is not particularly limited, but is, for example, 2.5 V to 4.5 V. A range of the pack voltage is likewise not particularly limited, but is, for example, 12.5 V to 22.5 V in the case of a configuration in which, for example, five cell voltages, are connected in series.

Also, the current-carrying path which is remained is a path along which a sneak current flows via the plurality of protection elements 10A, 10B, and 10C in a state in which one of the two fuse elements provided in each of the plurality of protection elements 10A, 10B, and 10C has been blown.

[Operation Method and Operation Principle of Protection Circuit]

Next, the operation principle of the protection circuit of the present embodiment will be specifically described by taking the following first to sixth cases as examples. In the first to sixth cases, for convenience of description, a case where another part is not mounted on the current-carrying path will be described.

Figure 3:
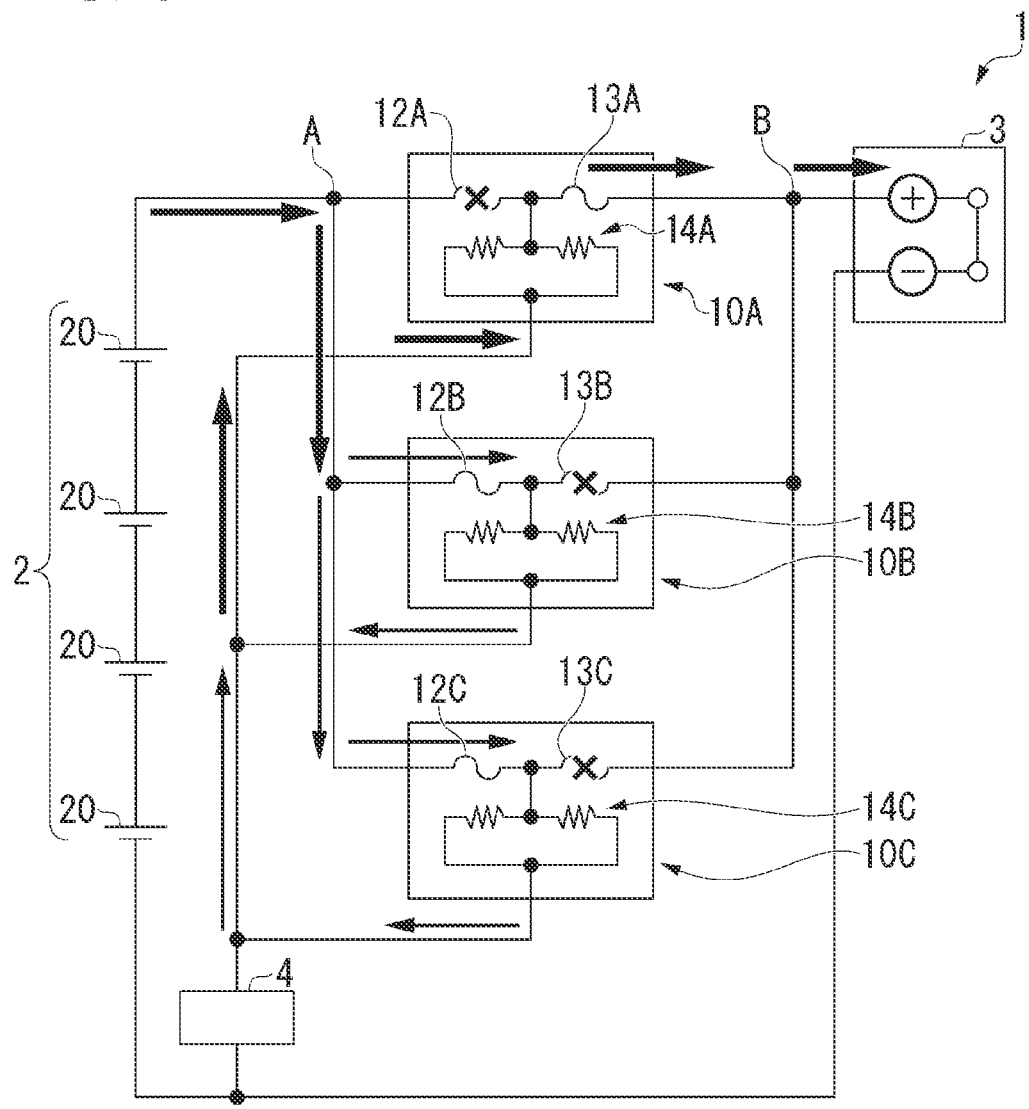
FIG. 3 is a diagram for describing a first case in which a current cutoff process is performed by the protection circuit of FIG. 1.

FIG. 3 is a diagram for describing the first case in which a current cutoff process is performed by the protection circuit 1 of FIG. 1. In the first case, it is assumed that an overcurrent flows due to the occurrence of an external short circuit or the like and the first fuse element 12A and the second fuse elements 13B and 13C are blown.

In this case, because the first fuse element 12A is a fuse element on the secondary battery side and the second fuse elements 13B and 13C are fuse elements on the charger side, no current is cut off between the secondary battery 2 side and the charger 3 side and a sneak current flows via the first fuse elements 12B and 12C and the second fuse element 13A. If the second fuse element 13A is blown due to this sneak current, a current is cut off between the secondary battery 2 side and the charger 3 side.

Therefore, in the present embodiment, preferably, the lower limit value of the operating power of the protection element 10A is greater than the power calculated on the basis of the voltage of the secondary battery 2 and the composite resistance of the heaters 14A, 14B, and 14C on the current-carrying path which is remained. Thereby, the heater 14A in the protection element 10A on the current-carrying path which is remained is overheated due to the sneak current flowing through the current-carrying path which is remained and the current-carrying path which is remained is cut off by the destruction of the heater 14A due to the heat.

The secondary battery 2 normally has a voltage range as a normal region from which an over-discharging region and an over-charging region are excluded. Thus, preferably, the voltage of the secondary battery 2 used when the power W is calculated is a lower limit value of the voltage range of the secondary battery. When the heater of each protection element has resistance tolerance, it is preferable to calculate the composite resistance of the heaters 14A, 14B, and 14C on the current-carrying path which is remained from the lower limit value and the upper limit value of the resistance tolerance of the heater. In this case, the lower limit value of the operating power of the protection element 10A is calculated from the lower limit value of the voltage range in the charging/discharging process of the secondary battery 2 and the lower limit value and the upper limit value of the resistance tolerance of the heater. Thereby, even if the power applied to the protection element 10A varies due to the sneak current flowing through the current-carrying path which is remained, it is possible to reliably cut off the current-carrying path which is remained due to destruction of the heater 14A.

Figure 4:
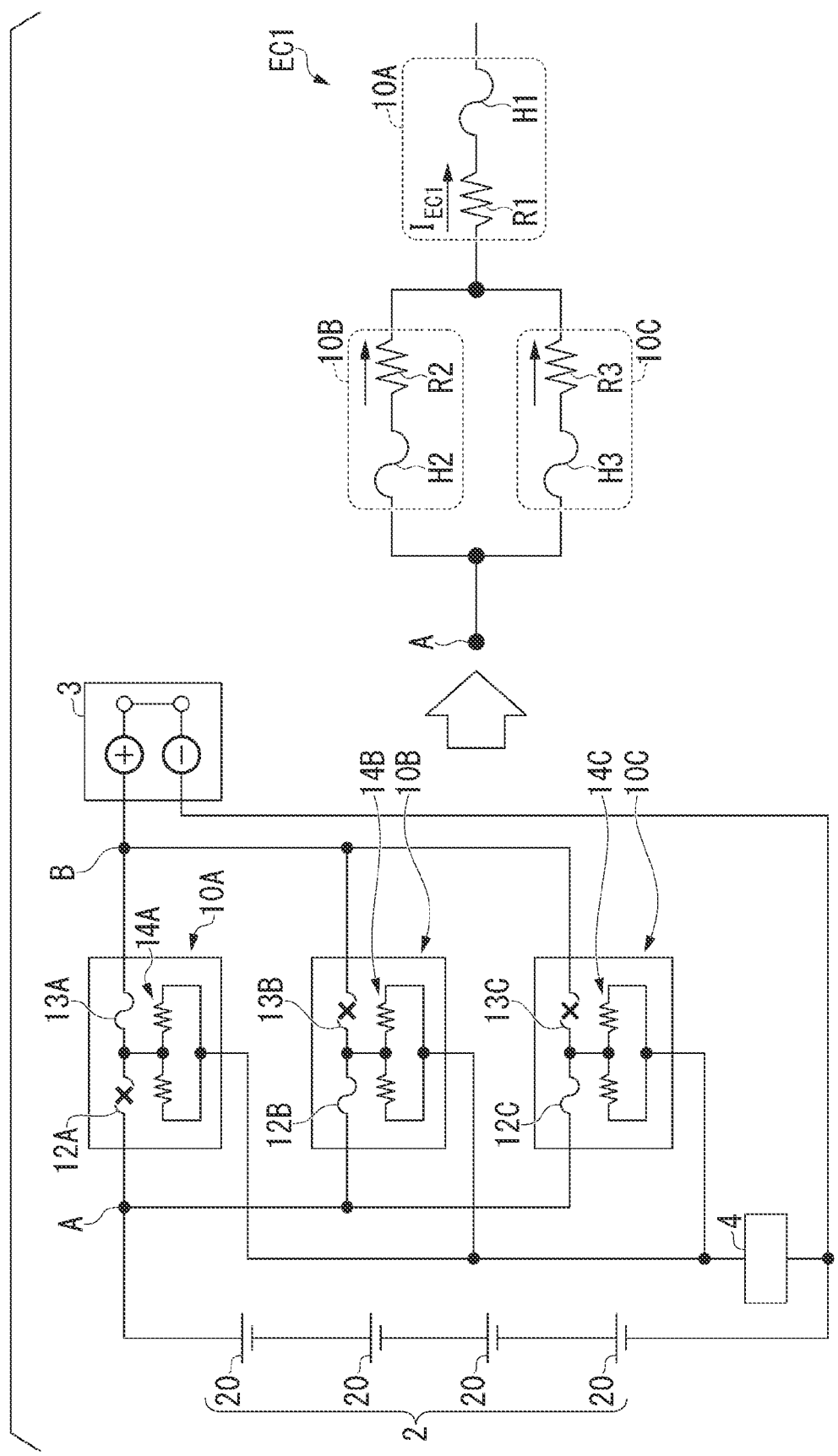
FIG. 4 is a diagram showing an equivalent circuit corresponding to the first case of FIG. 3.

As shown in FIG. 4, the protection circuit 1 in the state of FIG. 3 can be represented by an equivalent circuit EC1 in which two resistors R2 and R3 connected in parallel and one resistor R1 are connected in series. When a current $I_{EC1}$ (a sneak current) flows through the equivalent circuit EC1 and the resistor R1 is destructed, a current is cut off at the parallel connection point A and the parallel connection point B.

Consequently, in the equivalent circuit EC1 of FIG. 4, composite resistance R0 of the resistors R1, R2, and R3 within the equivalent circuit EC1 is obtained and the current $I_{EC1}$ flowing through the equivalent circuit EC1 is obtained from the composite resistance using Ohm's law. Further, the power W1 at the resistor R1 is calculated from the voltage V between the parallel connection point A and the parallel connection point B ($W1=(I_{EC1})^2 \times R1$). Power higher than the power W1 calculated above can be set as the operating power of the protection element 10A.

As an example of calculation, for example, it is assumed that the voltage range in the charging/discharging process of the secondary battery 2 is 12.5 V to 22.5 V and the resistance tolerances of the heaters 14A, 14B, and 14C are 4.8Ω to 8.0Ω. In this case, the lower limit value of the voltage range of the secondary battery 2 is 12.5 V, the lower limit value of the resistance tolerance of the heaters 14A, 14B, and 14C is 4.8Ω, and the upper limit value thereof is 8.0Ω.

When the lower and upper limit values of the resistance tolerance of the heater have been used, there are four combination patterns of resistance values of the resistors R1, R2, and R3 in the equivalent circuit EC1. Table 2 shows results of calculating power W1, W2, and W3 for each combination pattern.

TABLE 2

|  |  | Combination pattern | | | |
|---|---|---|---|---|---|
|  |  | 1 | 2 | 3 | 4 |
| Resistor R1 | [Ω] | 4.8 | 8.0 | 8.0 | 4.8 |
| Resistor R2 | [Ω] | 8.0 | 4.8 | 8.0 | 8.0 |
| Resistor R3 | [Ω] | 8.0 | 4.8 | 4.8 | 4.8 |

TABLE 2-continued

|  |  | Combination pattern | | | |
|---|---|---|---|---|---|
|  |  | 1 | 2 | 3 | 4 |
| Composite resistance R0 | [Ω] | 8.8 | 10.4 | 11.0 | 7.8 |
| Voltage V between A and B | [V] | 12.5 | 12.5 | 12.5 | 12.5 |
| Current I1 flowing through R1 | [A] | 1.4 | 1.2 | 1.1 | 1.6 |
| Power W1 applied to R1 | [W] | 9.7 | 11.6 | 10.3 | 12.3 |
| Current I2 flowing through R2 | [A] | 0.7 | 0.6 | 0.4 | 0.6 |
| Power W2 applied to R2 | [W] | 4.0 | 1.7 | 1.5 | 2.9 |
| Current I3 flowing through R3 | [A] | 0.7 | 0.6 | 0.7 | 1.0 |
| Power W3 applied to R3 | [W] | 4.0 | 1.7 | 2.4 | 4.8 |

In Table 2, in combination pattern 4, the lower limit value (12.5 V) of the voltage range in the charging/discharging process of the secondary battery 2 is set as the voltage V that is applied to both ends of the equivalent circuit EC1. The lower limit value (4.8 V) of the resistance tolerances of the heaters 14A and 14C is set as a resistance value of the resistors R1 and R3 and the upper limit value (8.0 V) of the resistance tolerance of the heaters 14B is set as a resistance value of the resistor R2. At the time of this combination pattern 4, the power W1 (12.3 W) applied to the resistor R1 reaches a maximum value. Consequently, in the first case, preferably, the power W1 calculated on the basis of the voltage V applied to both ends of the equivalent circuit EC1 and the composite resistance R0 of the resistors R1, R2, and R3 is set so that the power W1 is less than the lower limit value of the operating power of the protection element 10A.

Figure 5:
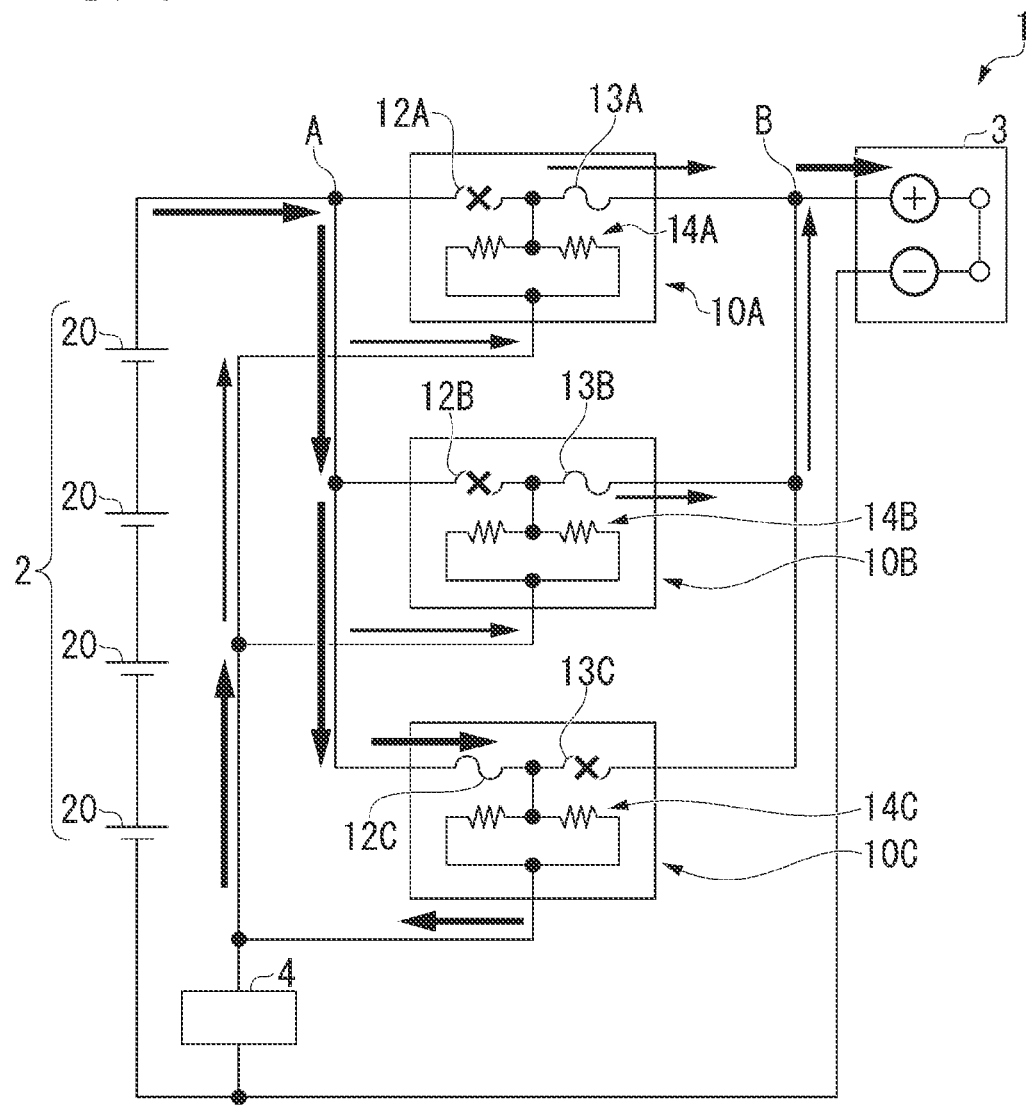
FIG. 5 is a diagram for describing a second case in which a current cutoff process is performed by the protection circuit of FIG. 1.

FIG. 5 is a diagram for describing the second case in which a current cutoff process is performed by the protection circuit 1 of FIG. 1. In the second case, it is assumed that an overcurrent flows due to the occurrence of an external short circuit or the like and the first fuse elements 12A and 12B and the second fuse element 13C are blown.

In this case, because the first fuse elements 12A and 12B are fuse elements on the secondary battery side and the second fuse element 13C is a fuse element on the charger side, no current is cut off between the secondary battery 2 side and the charger 3 side and a sneak current flows through the first fuse element 12C and the second fuse elements 13A and 13B. If the heater 14C is destructed due to this sneak current, a current is cut off between the secondary battery 2 side and the charger 3 side.

Figure 6:
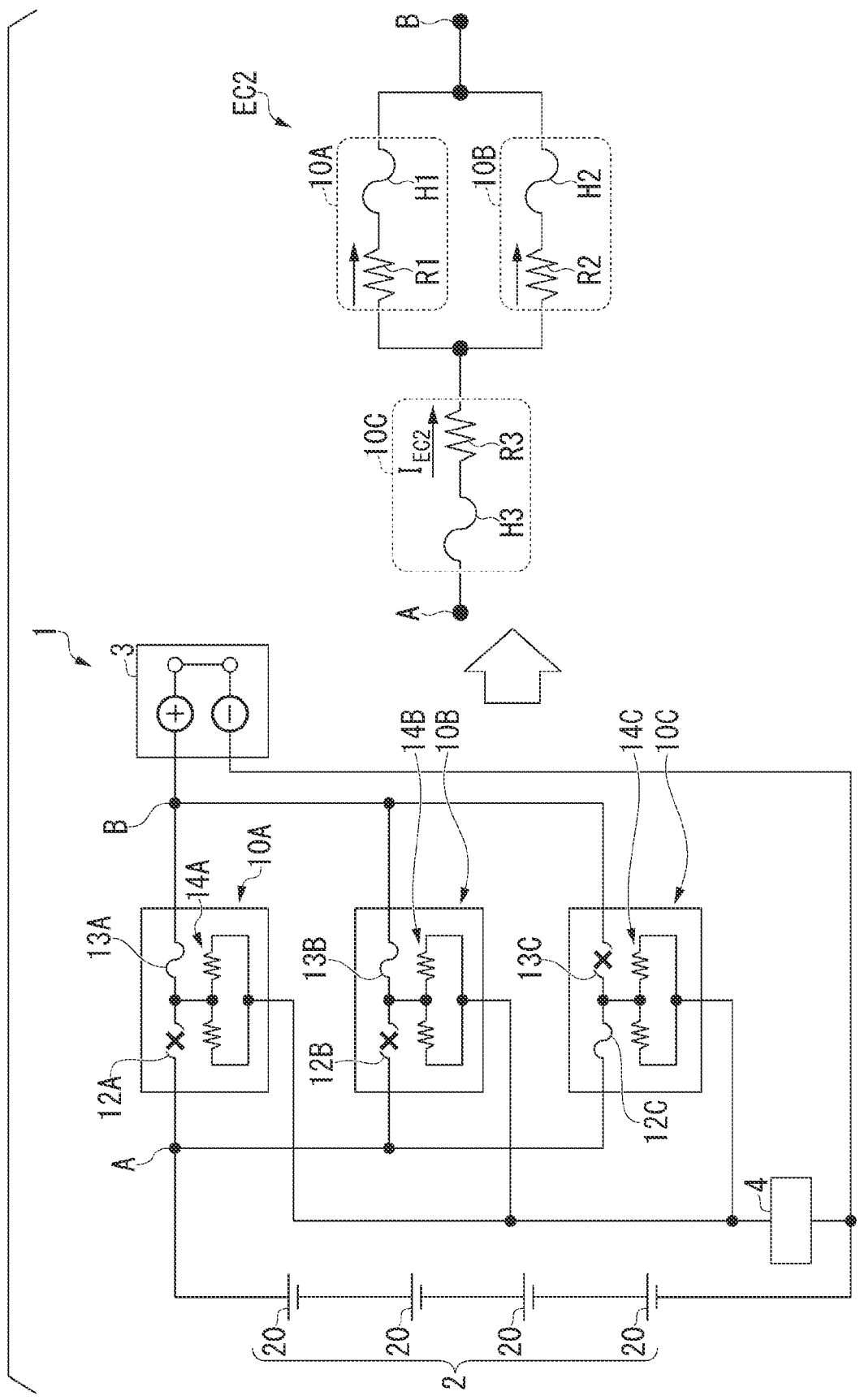
FIG. 6 is a diagram showing an equivalent circuit corresponding to the second case of FIG. 5.

As shown in FIG. 6, the protection circuit 1 in the state of FIG. 5 can be represented by an equivalent circuit EC2 in which one resistor R3 and two resistors R1 and R2 connected in parallel are connected in series. When a current $I_{EC2}$ (a sneak current) flows through the equivalent circuit EC2 and the resistor R3 is destructed, a current is cut off at the parallel connection point A and the parallel connection point B.

In the equivalent circuit EC2 of FIG. 6, as in the equivalent circuit EC1 of FIG. 4, composite resistance R0 of resistors R1, R2, and R3 within the equivalent circuit EC2 is obtained and the current $I_{EC2}$ flowing through the equivalent circuit EC2 is obtained from the composite resistance using Ohm's law. Furthermore, the power W3 at the resistor R3 is calculated from the voltage V between the parallel connection point A and the parallel connection point B ($W3=(I_{EC2})^2 \times R3$). Power higher than the power W3 calculated above can be set as the operating power of the protection element 10C.

Also, in the second case, preferably, the voltage V applied to both ends of the equivalent circuit EC2 is set as the lower limit value of the voltage range in the charging/discharging process of the secondary battery 2, the resistance value of the resistors R1 and R3 is set as the lower limit value of the resistance tolerances of the heaters 14A and 14C, and the resistance value of the resistor R2 is set as the upper limit value of the resistance tolerance of the heater 14B. Even in this case, as in the above-described first case, preferably, the power W3 calculated from the voltage V applied to both ends of the equivalent circuit EC2 and the composite resistance R0 of the resistors R1, R2, and R3 is set so that the power W3 is less than the lower limit value of the operating power of the protection element 10C.

Furthermore, the lower limit value of the operating power of the protection element 10B can also be set on the basis of a calculation process similar to the above-described calculation process. Also, because the equivalent circuit EC2 is substantially the same as the equivalent circuit EC1, the power W3 is the same as the power W1.

Accordingly, in the protection circuit 1 in which the three protection elements as shown in FIG. 1 are connected in parallel, it is only necessary to set the lower limit value of the operating power of the protection elements 10A, 10B, and 10C to a value greater than the power W1 (=W3).

Figure 7:
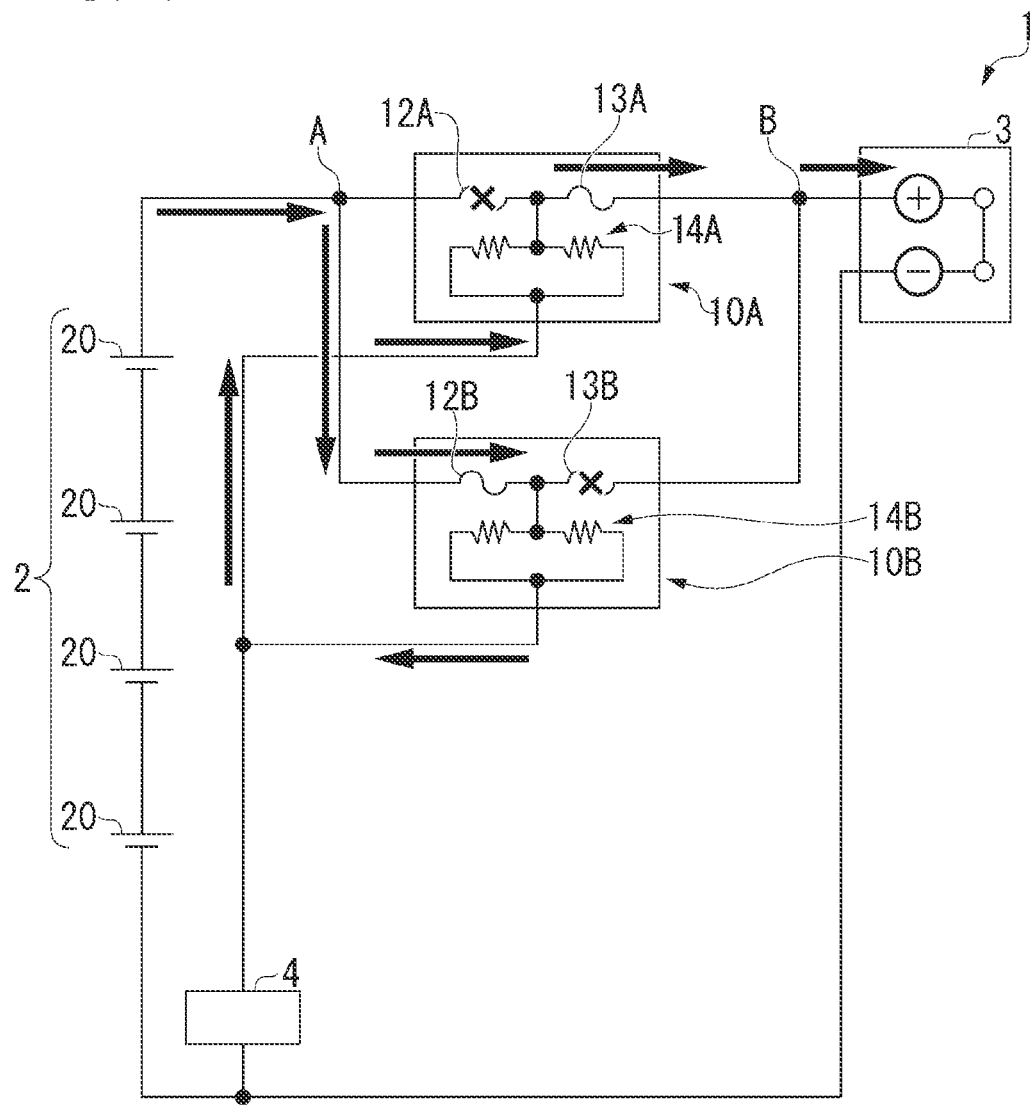
FIG. 7 is a diagram for describing a third case in which a current cutoff process is performed in a modified example of the protection circuit of FIG. 1.

FIG. 7 is a diagram for describing the third case in which a current cutoff process is performed in a modified example of the protection circuit 1 of FIG. 1. In the third case, it is assumed that two protection elements 10A and 10B are provided in the protection circuit 1, an overcurrent flows due to the occurrence of an external short circuit or the like, and a first fuse element 12A and a second fuse element 13B are blown. In this case, because the first fuse element 12A is a fuse element on a secondary battery side and the second fuse element 13B is a fuse element on a charger side, no current is cut off between a secondary battery 2 side and a charger 3 side and a sneak current flows via a first fuse element 12B and a second fuse element 13A. If the heater 14A or the heater 14B is destructed due to this sneak current, a current is cut off between the secondary battery 2 side and the charger 3 side.

Figure 8:
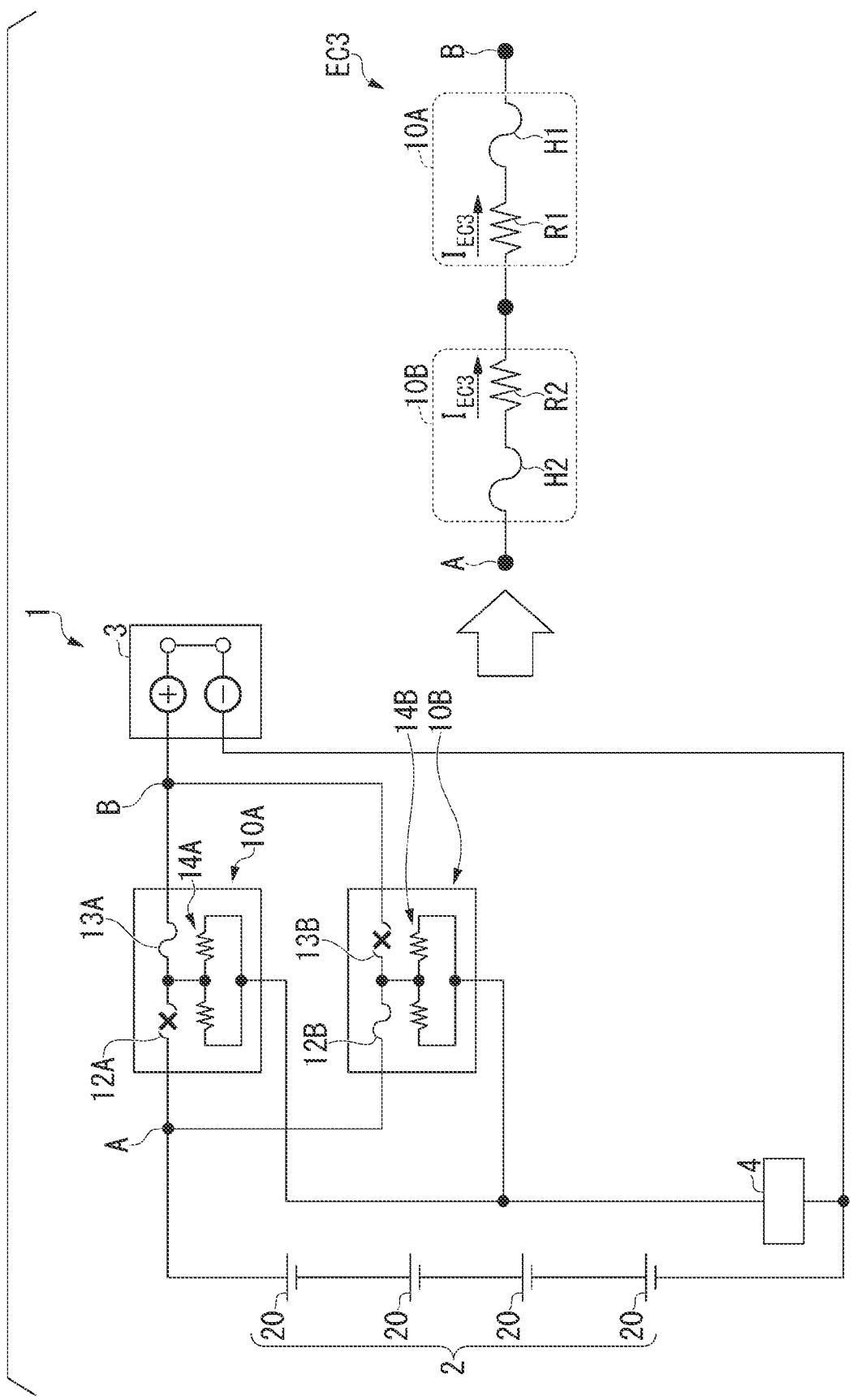
FIG. 8 is a diagram showing an equivalent circuit corresponding to the third case of FIG. 7.

As shown in FIG. 8, the protection circuit in the state of FIG. 7 can be represented by an equivalent circuit EC3 in which two resistors R1 and R2 are connected in series. A current $I_{EC3}$ (a sneak current) flows through this equivalent circuit EC3 and the resistor R1 or the resistor R2 is destructed, so that a current is cut off at a parallel connection point A and a parallel connection point B.

Consequently, even in the equivalent circuit EC3 of FIG. 8, composite resistance R0 of the resistors R1 and R2 within the equivalent circuit EC3 is obtained and the current $I_{EC3}$ flowing through the equivalent circuit EC3 is obtained from the composite resistance using Ohm's law. Furthermore, power W1 at the resistor R1 is calculated from a voltage V between the parallel connection point A and the parallel connection point B ($W1=(I_{EC3})^2 \times R1$). Power higher than the power W1 calculated above can be set as operating power of the protection element 10A.

Also, in the third case, preferably, the voltage V applied to both ends of the equivalent circuit EC3 is set as a lower limit value of a voltage range in a charging/discharging process of the secondary battery 2 and a resistance value of the resistors R1 and R2 are set as a lower limit value of resistance tolerances of heaters 14A and 14B. In this case, the power W1 (or power W2) calculated on the basis of a voltage V applied to both ends of the equivalent circuit EC3 and composite resistance R0 of the resistors R1 and R2 can be set so that the power W1 (or the power W2) is less than a lower limit value of operating power of the protection elements 10A and 10B.

Figure 9:
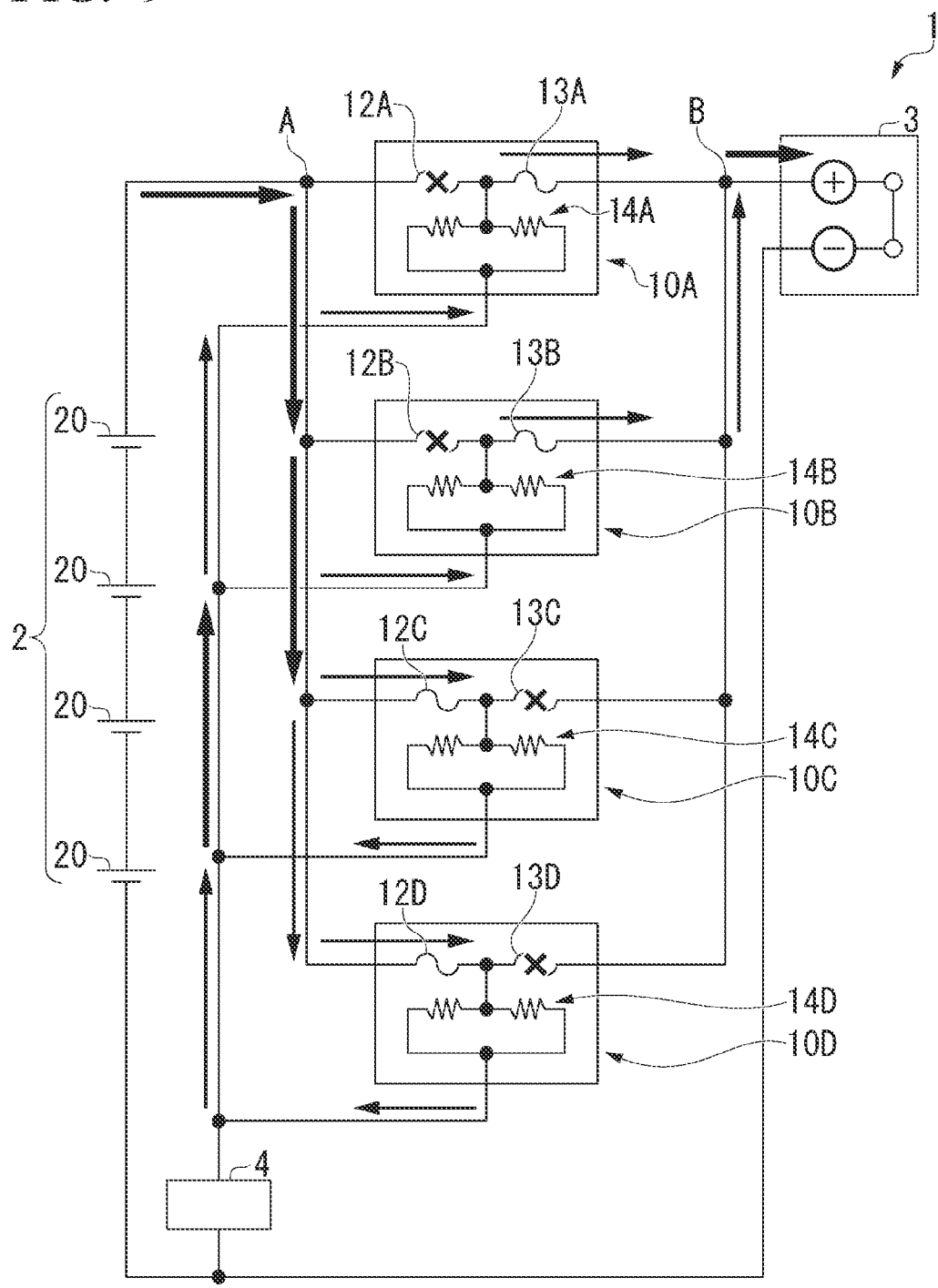
FIG. 9 is a diagram for describing a fourth case in which a current cutoff process is performed in a modified example of the protection circuit of FIG. 1.

FIG. 9 is a diagram for describing the fourth case in which a current cutoff process is performed in a modified example of the protection circuit 1 of FIG. 1. In the fourth case, it is assumed that four protection elements 10A, 10B, 10C, and 10D are provided in the protection circuit, an overcurrent flows due to the occurrence of an external short circuit or the like, and first fuse elements 12A and 12B and second fuse elements 13C and 13D are blown. Also, it is assumed that the protection elements 10A, 10B, 10C, and 10D basically have the same configuration.

Figure 10:
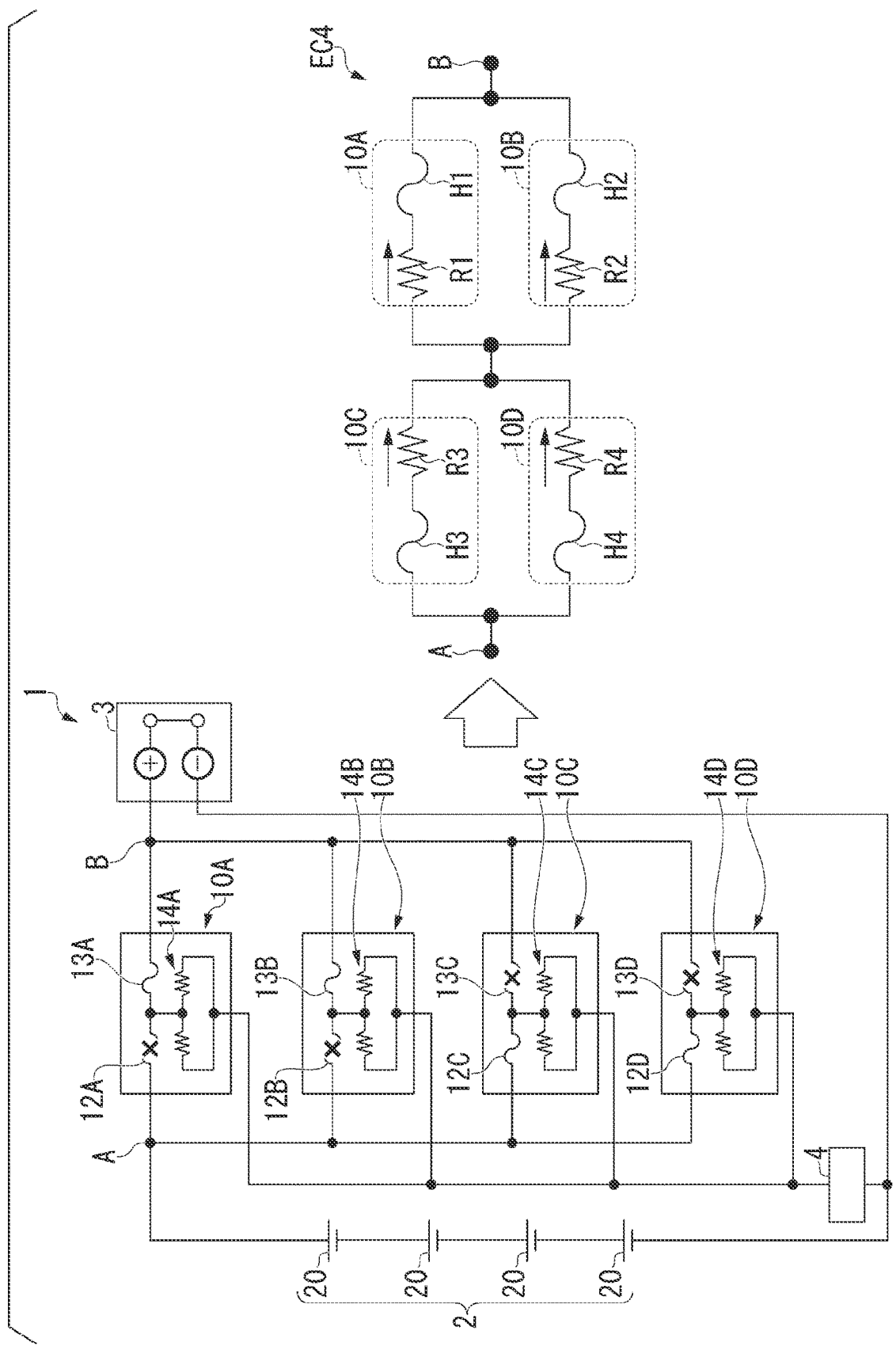
FIG. 10 is a diagram showing an equivalent circuit corresponding to the fourth case of FIG. 9.

In this case, because the first fuse elements 12A and 12B are fuse elements on the secondary battery side and the second fuse elements 13C and 13D are fuse elements on the charger side, no current is cut off between a secondary battery 2 side and a charger 3 side and a sneak current flows via first fuse elements 12C and 12D and second fuse elements 13A and 13B. As shown in FIG. 10, the protection circuit in the state of FIG. 9 is represented by an equivalent circuit EC4 in which two resistors R3 and R4 connected in parallel and two resistors R1 and R2 connected in parallel are connected in series.

Figure 11:
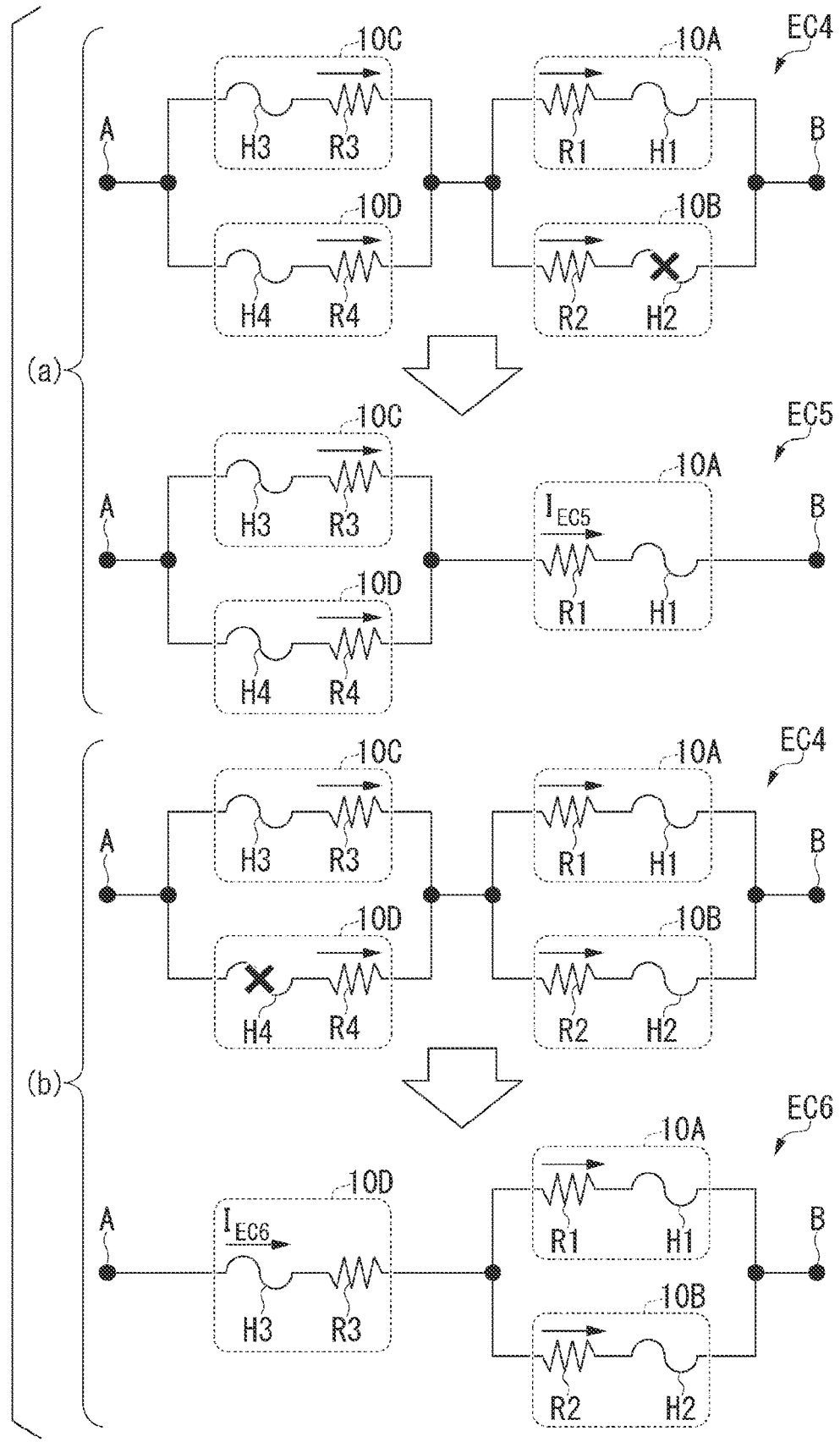
FIGS. 11(a) and 11(b) are diagrams showing the continuation of FIG. 10.

Subsequently, any one of the first fuse elements 12C and 12D and the second fuse elements 13A and 13B is blown due to the sneak current continuously flowing through the current-carrying path which is remained of the protection circuit. For example, when the second fuse element 13B is blown due to a sneak current, as shown in FIG. 11(a), a path of a fuse H2 corresponding to the second fuse element 13B is lost and the equivalent circuit EC4 becomes an equivalent circuit EC5 similar to the equivalent circuit EC1 of FIG. 4. Consequently, in the fourth case shown in FIG. 9, it is only necessary to select a protection element whose lower limit value of the operating power is greater than the power W1 as the protection element 10A.

Also, even if the second fuse element 13A is blown due to the sneak current from the state of FIG. 10, the equivalent circuit EC4 becomes an equivalent circuit similar to the equivalent circuit EC5 of FIG. 11(a). Consequently, in the fourth case shown in FIG. 9, it is only necessary to select a protection element whose lower limit value of the operating power is greater than the power W1 as the protection element 10B.

Also, when the first fuse element 12D is blown due to the sneak current from the state of FIG. 10, the equivalent circuit EC4 becomes an equivalent circuit EC6 similar to the equivalent circuit EC2 of FIG. 6 as shown in FIG. 11(b). Also, even if the first fuse element 12C is blown due to the sneak current from the state of FIG. 10, the equivalent circuit EC4 becomes an equivalent circuit similar to the equivalent circuit EC6 of FIG. 11(b). Consequently, in the fourth case shown in FIG. 9, it is only necessary to select the protection element whose lower limit value of the operating power is greater than the power W1 (=W3) as the protection elements 10C and 10D.

Figure 12:
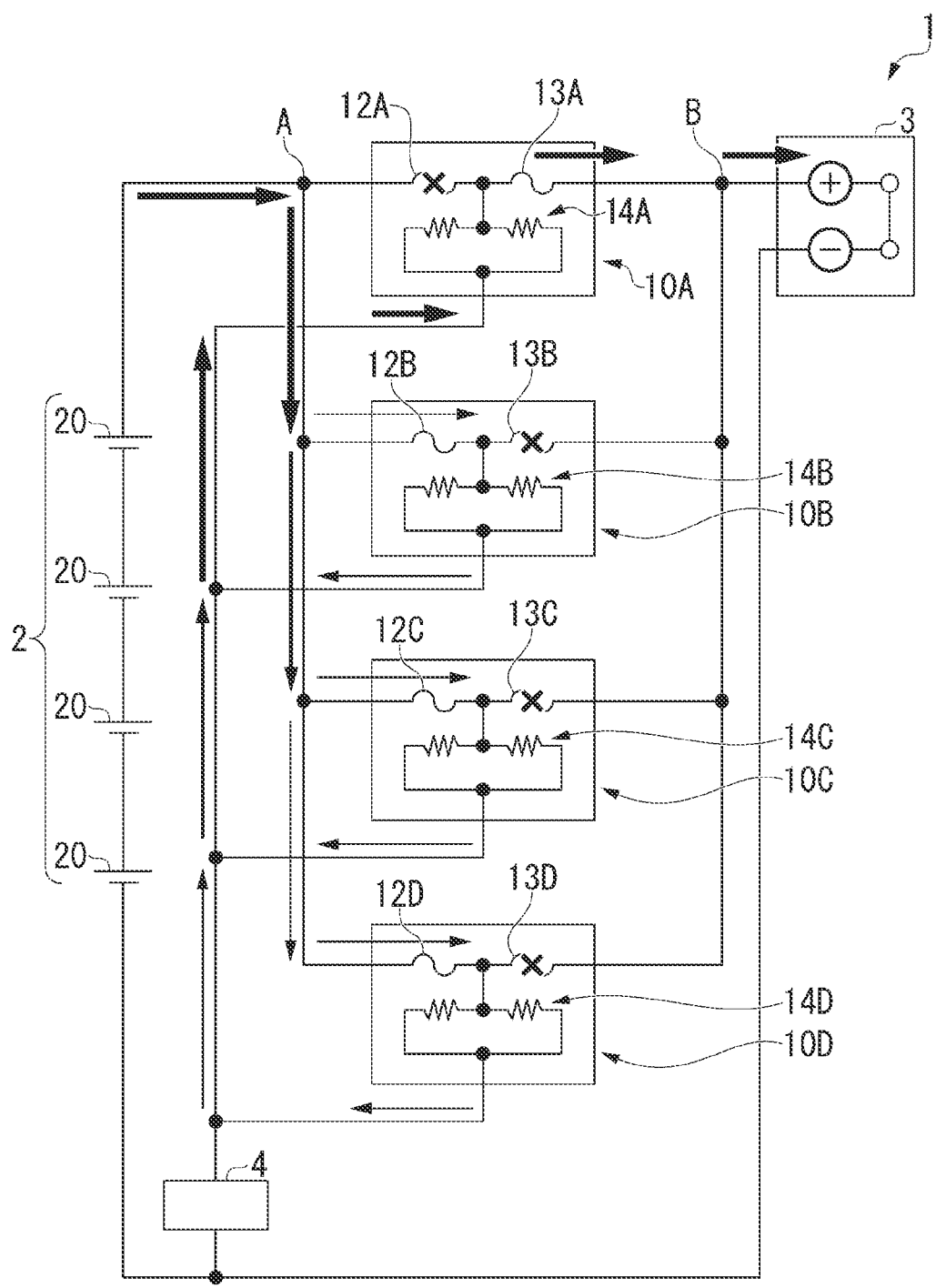
FIG. 12 is a diagram for describing a fifth case in which a current cutoff process is performed in a modified example of the protection circuit of FIG. 1.

FIG. 12 is a diagram for describing the fifth case in which a current cutoff process is performed in a modified example of the protection circuit 1 of FIG. 1. In the sixth case, it is assumed that four protection elements 10A, 10B, 10C, and 10D are provided in the protection circuit 1, an overcurrent flows due to the occurrence of an external short circuit or the like, and a first fuse element 12A and second fuse elements 13B, 13C, and 13D are blown.

In this case, because the first fuse element 12A is a fuse element on a secondary battery side and the second fuse elements 13B, 13C, and 13D are fuse elements on a charger side, no current is cut off between a secondary battery 2 side and a charger 3 side and a sneak current flows via first fuse elements 12B, 12C, and 12D and a second fuse element 13A. If the heater 14A is destructed due to this sneak current, a current is cut off between the secondary battery 2 side and the charger 3 side.

Figure 13:
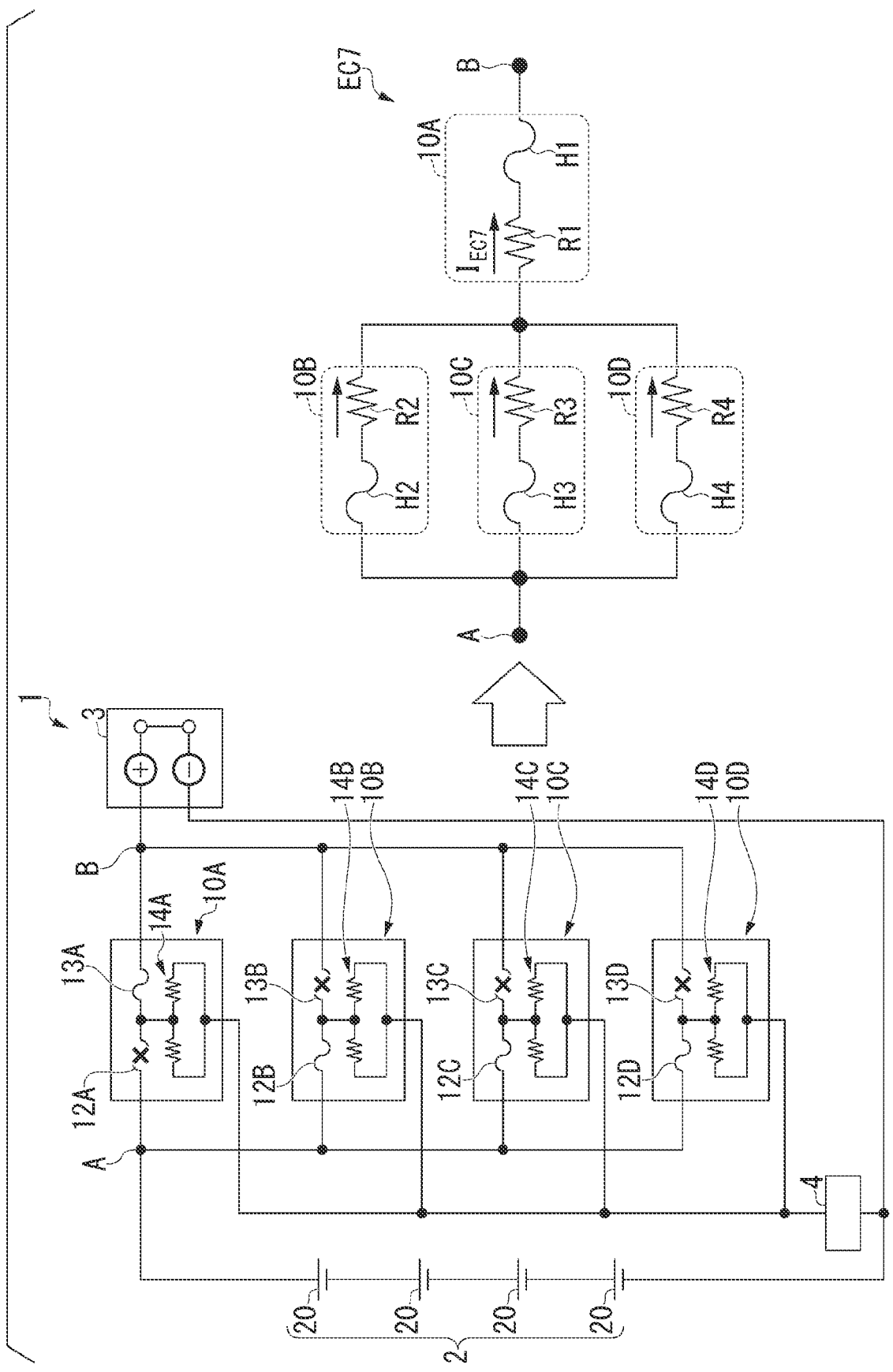
FIG. 13 is a diagram showing an equivalent circuit corresponding to the fifth case of FIG. 12.

As shown in FIG. 13, the protection circuit in the state of FIG. 12 can be represented by an equivalent circuit EC7 in which three resistors R2, R3, and R4 connected in parallel and one resistor R1 are connected in series.

Subsequently, any one of the first fuse elements 12B, 12C, and 12D is blown due to the sneak current continuously flowing through the current-carrying path which is remained of the protection circuit. In this case, the equivalent circuit EC7 becomes an equivalent circuit similar to the equivalent circuit EC1 in FIG. 4. Consequently, even in the fifth case shown in FIG. 12, it is only necessary to select a protection element having a lower limit value of the operating power higher than the power W1 as the protection element 10A.

Although the case where the first fuse element 12A and the second fuse elements 13B, 13C, and 13D are blown has been described with reference to FIG. 13, it is also possible to apply consideration similar to the above-described consideration when any one of the plurality of first fuse elements 12A, 12B, 12C, and 12D is blown and second fuse elements in all the protection elements other than the protection element having the blown first fuse element are blown.

Therefore, even in a protection circuit in which four protection elements are connected in parallel as shown in FIG. 9, it is inferred that it is only necessary to set the lower limit value of the operating power of the protection elements 10A, 10B, 10C, and 10D to a value greater than the power W1.

As described above, according to the present embodiment, an overcurrent flows along a current-carrying path between the secondary battery 2 and the external circuit, so that, after one of the two fuse elements provided in each of the plurality of protection elements 10A, 10B, and the like is blown, the heater provided in at least one of the plurality of protection elements generates heat due to a sneak current flowing through the plurality of protection elements 10A, 10B, and the like on the current-carrying path which is remained and the current-carrying path which is remained is cut off due to destruction of the above-described heater. Because of this, the circuit on one side and the circuit on the other side of the first fuse element (or the second fuse element) can be cut off.

Consequently, it is possible to reliably prevent an overcurrent or a sneak current after cutoff with a simple circuit configuration without providing a rectifier element such as a diode in a protection circuit 1. Also, in the circuit design of the protection circuit 1, it is possible to reliably cut off the circuit without considering the heat capacity balance including circuit parts around the SCP, a housing of the SCP, or the like and improve safety while implementing an easy circuit design. Furthermore, because it is not necessary to provide a rectifier element such as a diode, it is possible to reduce the number of parts and reduce a failure rate of a circuit while implementing cost reduction.

Also, because the temperature coefficients of resistance of the heaters 14A, 14B, and 14C are less than 500 ppm/° C., it is possible to quickly destruct the heaters 14A, 14B, and 14C due to the overcurrent, prevent thermal deformation of members constituting the protection elements 10A, 10B, and 10C, and prevent a negative influence on a device and a human body.

Also, because the lower limit value of the operating power of each protection element is set so that it is greater than power calculated on the basis of the voltage of the secondary battery 2 and the resistance including the composite resistance of the plurality of heaters 14A, 14B, and the like on the current-carrying path which is remained, it is possible to easily destruct a heater constituting the protection element on the current-carrying path which is remained due to the overcurrent flowing through the current-carrying path which is remained.

Furthermore, because the lower limit value of the operating power of each protection element is calculated from the lower limit value of the voltage range in the charging/discharging process of the secondary battery 2 and the lower limit value and the upper limit value of the resistance tolerance of the heater, it is possible to construct the protection circuit 1 with higher operating accuracy and improve the reliability of the protection circuit 1.

Also, because it is possible to widen the voltage operating range of each protection element by reducing the resistance tolerance in a process of selecting the resistance of the heater of each protection element or the like, it is possible to improve the operation accuracy and reliability by making such adjustments as appropriate.

Also, in the design of the protection circuit 1, the lower limit value of the voltage range of the secondary battery 2 is set as the voltage V that is applied to both ends of the equivalent circuit EC1 using the equivalent circuit EC1 in which two resistors R2 and R3 connected in parallel and one resistor R1 are connected in series, the lower limit value of the resistance tolerance of the heater is set as the resistance value of the resistors R1 and R3, and the upper limit value of the resistance tolerance of the heater is set as the resistance value of the resistor R2. Because the power W calculated on the basis of the voltage V and the composite resistance R0 of the resistors R1, R2, and R3 is set so that the power W is less than the lower limit value of the operating power of the protection elements 10A, 10B, and 10C, it is possible to further easily design a protection circuit in which three or more protection elements are mounted.

Although embodiments of the present invention have been described above in detail, the present invention is not limited to the above-described embodiments and various modifications and changes can be made without departing from the scope and spirit of the present invention described in the claims.

REFERENCE SIGNS LIST

1 Protection circuit
2 Secondary battery
3 Charger
4 Switching element
10A Protection element
10B Protection element
10C Protection element
10D Protection element
11A Board
12A First fuse element
12B First fuse element
12C First fuse element
12D First fuse element
13A Second fuse element
13B Second fuse element
13C Second fuse element
13D Second fuse element
14A Heater
14B Heater
14C Heater 15A First electrode unit
15B First electrode unit
15C First electrode unit
16A Second electrode unit
16B Second electrode unit
16C Second electrode unit
17A Third electrode unit
17B Third electrode unit
17C Third electrode unit
18A Fourth electrode unit
18B Fourth electrode unit
18C Fourth electrode unit
20 Battery cell

What is claimed is:

1. A protection circuit comprising:
a plurality of protection elements connected in parallel on a current-carrying path between a battery and an external circuit,
wherein each of the plurality of the protection elements has two fuse elements connected in series on the current-carrying path and a heater configured to blow the fuse elements in a current-carrying process, and
wherein, after one of the two fuse elements provided in each of the plurality of protection elements is blown due to an overcurrent flowing along the current-carrying path, the heater provided in at least one of the plurality of protection elements generates heat due to a sneak current flowing via the plurality of protection elements on the current-carrying path which is remained and the current-carrying path which is remained is cut off due to destruction of the heater.

2. The protection circuit according to claim 1,
wherein a temperature coefficient of resistance of the heater is less than 500 ppm/° C.

3. The protection circuit according to claim 1,
wherein a lower limit value of operating power of the plurality of protection elements is set to a value of power higher than power calculated on the basis of a voltage of the battery and resistance including composite resistance of a plurality of heaters on the current-carrying path which is remained.

4. The protection circuit according to claim 3,
wherein the voltage of the battery has a lower limit value of a voltage range of the battery,
wherein the composite resistance of the plurality of heaters is calculated from a lower limit value and an upper limit value of resistance tolerance of the heater, and
wherein the lower limit value of the operating power of the plurality of protection elements is calculated from a lower limit value of a voltage range in a charging/discharging process of the battery and the lower limit value and the upper limit value of the resistance tolerance of the heater.

5. The protection circuit according to claim 4,
wherein an equivalent circuit in which two resistors connected in parallel and one resistor are connected in series is used,
wherein the lower limit value of the voltage range in the charging/discharging process of the battery is set for a voltage applied to both ends of the equivalent circuit,
wherein the lower limit value of the resistance tolerance of the heater is set as a resistance value of the one resistor and a resistance value of one of the two resistors,
wherein the upper limit value of the resistance tolerance of the heater is set as a resistance value of an other of the two resistors, and
wherein power calculated on the basis of the voltage applied to both ends of the equivalent circuit and composite resistance of the two resistors and the one resistor is set so that the power is less than the lower limit value of the operating power of each of the plurality of protection elements.

6. The protection circuit according to claim 1, further comprising:
a first fuse element and a second fuse element as the two fuse elements connected in series;
a first electrode unit connected to the first fuse element on a side opposite to the second fuse element;
a second electrode unit connected to the second fuse element on a side opposite to the first fuse element;
a third electrode unit connected between the first fuse element and the second fuse element and connected to the heater in series; and
a fourth electrode unit connected to the heater on a side opposite to the third electrode unit.

7. The protection circuit according to claim 6,
wherein the first fuse element is connected to a side of the battery,
wherein the second fuse element is connected to a side of the external circuit, and
wherein the heater has one end connected to the first fuse element and the second fuse element via the third electrode unit and an other end connected to the battery via the fourth electrode unit.

8. The protection circuit according to claim 7, further comprising:
a switching element connected between the heater and the battery.

9. A battery pack comprising:
the protection circuit according to claim 1.

10. A method of operating a protection circuit including a plurality of protection elements connected in parallel on a current-carrying path between a battery and an external circuit, the method comprising:
after one of two fuse elements provided in each of the plurality of protection elements is blown due to an overcurrent flowing along the current-carrying path, generating heat on a heater provided in at least one of the plurality of protection elements, due to a sneak current flowing via the plurality of protection elements on the current-carrying path which is remained, the current-carrying path which is remained being cut off due to destruction of the heater.

* * * * *